US006945784B2

(12) United States Patent
Paquette et al.

(10) Patent No.: US 6,945,784 B2
(45) Date of Patent: Sep. 20, 2005

(54) GENERATING A MUSICAL PART FROM AN ELECTRONIC MUSIC FILE

(75) Inventors: John Paquette, Arlington, MA (US); Robert Ferry, Winchester, MA (US)

(73) Assignee: Namco Holding Corporation, San Diego, CA (US)

( * ) Notice: Subject to any disclaimer, the term of this patent is extended or adjusted under 35 U.S.C. 154(b) by 248 days.

(21) Appl. No.: 09/814,465

(22) Filed: Mar. 21, 2001

(65) Prior Publication Data

US 2001/0049086 A1 Dec. 6, 2001

Related U.S. Application Data

(60) Provisional application No. 60/191,368, filed on Mar. 22, 2000.

(51) Int. Cl.[7] .................................................. G09B 5/00

(52) U.S. Cl. ....................... 434/307 A; 84/609; 84/625; 84/660; 84/615; 84/616; 84/653; 84/654

(58) Field of Search ............................ 434/307 A, 308; 84/609, 625, 660–61, 645, 615, 616, 653, 664; 381/123

(56) References Cited

U.S. PATENT DOCUMENTS 5,142,961 A * 9/1992 Paroutaud .................... 84/726
5,315,057 A 5/1994 Land et al.
5,355,762 A * 10/1994 Tabata ......................... 84/609
5,389,730 A * 2/1995 Wachi ......................... 84/624
5,393,926 A 2/1995 Johnson
5,491,297 A 2/1996 Johnson
5,541,354 A 7/1996 Farrett et al.
5,663,517 A 9/1997 Oppenheim
5,736,663 A 4/1998 Aoki et al.
5,925,843 A * 7/1999 Miller et al. .................. 84/609
6,121,533 A * 9/2000 Kay ............................ 84/616
6,143,973 A * 11/2000 Kikuchi ....................... 84/645
6,201,176 B1 * 3/2001 Yourlo ........................ 84/609
6,252,152 B1 * 6/2001 Aoki et al. ................... 84/609
6,294,720 B1 * 9/2001 Aoki ........................... 84/611

* cited by examiner

*Primary Examiner*—Xuan M. Thai
*Assistant Examiner*—Cameron Saadat
(74) *Attorney, Agent, or Firm*—Wilmer Cutler Pickering Hale and Dorr LLP

(57) ABSTRACT

Generating a pitched musical part from an electronic music file comprised of instrumental parts includes generating a control stream that indicates which of the instrumental parts has a highest value for a period of time, selecting one of the instrumental parts for the period of time based on the control stream, and outputting the selected instrumental part for the period of time to produce the musical part. Generating a non-pitched musical part from an electronic music file includes identifying patterns in the electronic music file and selectively combining the patterns to produce the musical part.

65 Claims, 5 Drawing Sheets

GENERATING A MUSICAL PART FROM AN ELECTRONIC MUSIC FILE

GROSS-REFERENCE TO RELATED APPLICATION

This application claims priority from U.S. Provisional Application No. 60/191,368, filed on Mar. 22, 2000, the contents of which are hereby incorporated by reference into this application as if set forth herein in full.

INCORPORATION BY REFERENCE

U.S. Pat. Nos. 5,491,297 and 5,393,926 are hereby incorporated by reference into this application as if set forth herein in full.

1. Technical Field

This invention relates generally to generating a musical part from an electronic music file.

2. Background of the Invention

Karaoke machines provide instrumental parts for a vocal accompanist. Virtual instruments, such as those described in U.S. Pat. Nos. 5,491,297 and 5,393,926, allow untrained musicians to simulate playing a musical instrument. Both karaoke machines and virtual instruments use pre-recorded musical parts for audio.

Conventionally, such musical parts are prepared, and recorded, by skilled musicians. This process is time consuming, laborious, and expensive.

SUMMARY

The invention is a computer-implemented process for generating a "play-along" part, i.e., a musical part that can be played on a karaoke machine, virtual instrument, or similar device, based on information contained in an electronic music file. By generating a play-along part using information contained in an electronic music file, the invention reduces the need for a skilled musician to compose each new play-along part. As a result, the invention makes it possible to generate play-along parts for songs relatively cheaply and quickly.

In general, in one aspect, the invention is directed to generating a musical part from an electronic music file comprised of pitched instrumental parts. This aspect of the invention features generating a control stream that indicates which of the instrumental parts has a highest value for a period of time, selecting one of the instrumental parts for the period of time based on the control stream, and outputting the selected instrumental part for the period of time to produce the musical part. This aspect may include one or more of the following.

The control stream may be generated by examining other periods of time defined by the electronic music file, by comparing a contribution of one instrumental part for the period of time to a contribution of another instrumental part for the period of time, and/or based on a cost of switching between the one instrumental part and the other instrumental part. The process of generating the control stream may include obtaining measurement streams that include values for corresponding instrumental parts and identifying an instrumental part in the measurement streams that has the highest value for the period of time.

The process of generating the control stream may include merging the measurement streams to obtain a composite measurement stream. The instrumental part in the measurement streams that has the highest value for the period of time may be identified using the composite measurement stream. The control stream may be generated using a chooser object and selecting and outputting may be performed using a switcher object.

The process of obtaining the measurement streams may include analyzing aspects of the musical part. These aspects may include one or more of strum speed, average pitch, polyphony, loudness, and a vocal part. The electronic music file may be a Musical Instrument Digital Interface (MIDI) file. The processes of generating, selecting, and outputting may be repeated for a second period of time that follows a first period of time. In this case, the musical part may include the selected instrumental part for the first period of time and the selected instrumental part for the second period of time.

Each instrumental part may include a stream of events. Each event may have a time stamp. The time stamps of events that are within a predetermined time period of each other may be changed so that the time stamps are the same.

In general, in another aspect, the invention is directed to generating a musical part from an electronic music file. This aspect features identifying patterns in the electronic music file and selectively combining the patterns to produce the musical part. This aspect of the invention may include one or more of the following.

The patterns may include individual instrumental tracks in the electronic music file. The process of selectively combining the patterns may include selecting one of the patterns, determining if a rhythmic complexity of the selected pattern exceeds a predetermined threshold, and adding the selected pattern to the musical part if the rhythmic complexity of the selected pattern does not exceed the predetermined threshold. The selected pattern may be discarded if the rhythmic complexity of the selected pattern exceeds the predetermined threshold.

The rhythmic complexity of the selected pattern may be determined based on musical features of the selected pattern. The musical features may include one or more of a beat of the selected pattern, syncopated notes in the selected pattern, and proximity of notes in the selected pattern to other notes in the selected pattern.

The process of selectively combining the patterns may include selecting one of the patterns, determining if the selected pattern is similar to a pattern already in the musical part, and adding the selected pattern to the musical part if the selected pattern is not similar to a pattern already in the musical part. The selected pattern may be discarded if the selected pattern is similar to a pattern already in the musical part. The process of determining if the patterns are similar may be performed using a fuzzy comparison and/or a quantization process.

Patterns having relatively low frequencies may be combined to produce the musical part before patterns having relatively high frequencies are combined. The electronic music file may be a Musical Instrument Digital Interface (MIDI) file. The electronic music file may include events. All but pre-specified events may be removed from the electronic music file prior to performing the identifying and selectively combining processes.

This summary has been provided so that the nature of the invention can be understood quickly. A detailed description of illustrative embodiments of the invention is set forth below.

DESCRIPTION

Figure 1:
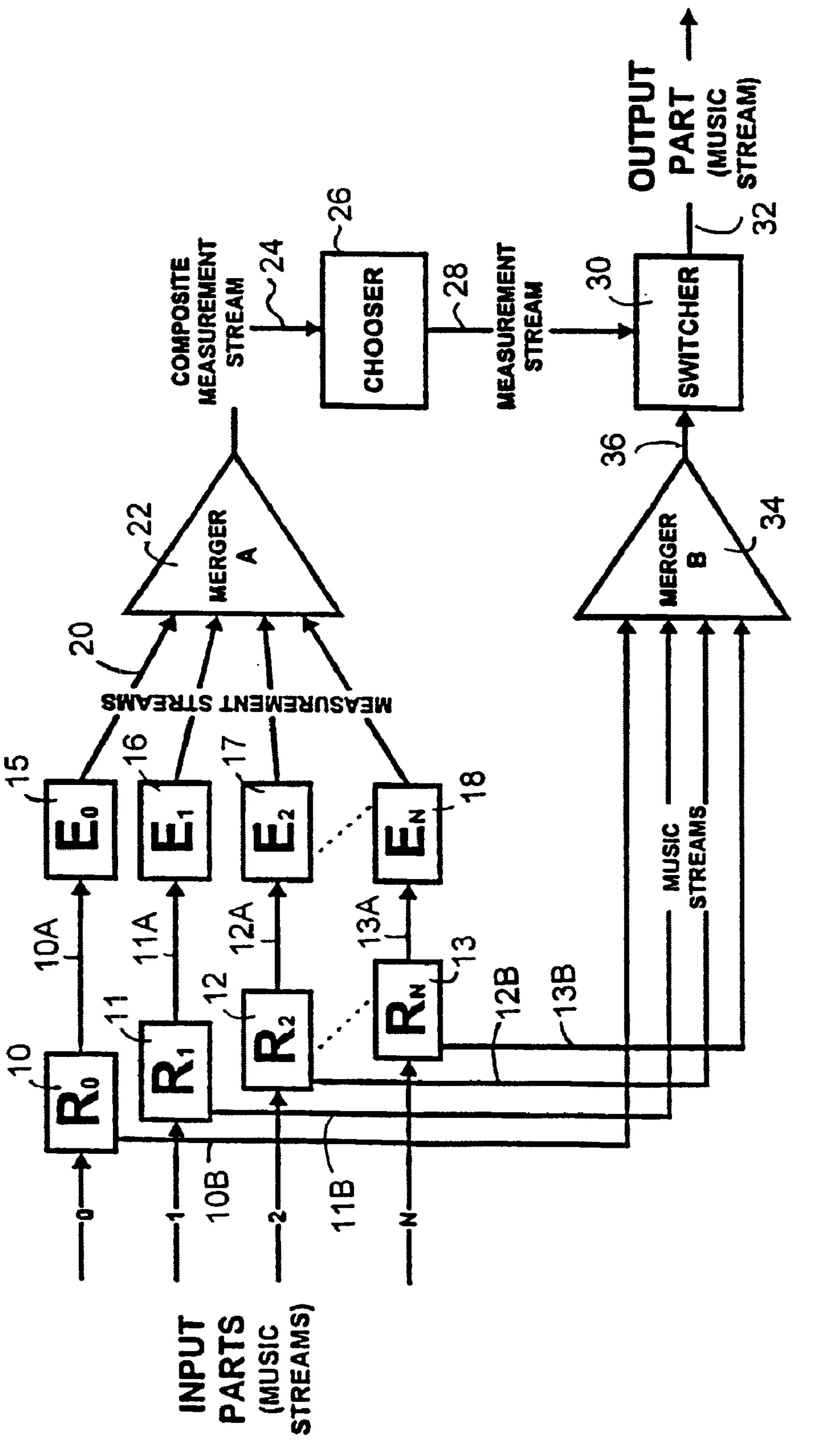
FIG. 1 is a block diagram of software for generating a pitched musical part.

Described herein are computer-implemented processes for generating musical parts from electronic music files, such as synthesizer control files (SCF). One example of a common SCF is the Musical Instrument Digital Interface (MIDI) file.

I. Definitions

An "object" is a software module for performing a function and/or representing a physical element.

An "event" is information about a particular moment in time of a musical composition. A musical part in an SCF file contains an ordered list of events. Each of these events instructs a synthesizer what to do at a given time, e.g., to start sounding a note, to stop sounding a note, to alter a note's pitch, etc.

An "event node" is an object that represents an event. Event nodes contain time stamps and other information. Event nodes are named for the operations that they perform, e.g. note-on, note-off, pitch bend, pitch change, etc., and can be collected, modified, created and deleted as required. "Event" and "event node" may be used interchangeably.

"SCF-time" is a time specified by a time stamp in an event node. SCF-time is measured relative to the beginning of a musical composition. The beginning of a musical composition is defined as SCF-time "zero".

An "event stream" is an SCF time-ordered sequence of event nodes which are delivered by an object responsible for providing each subsequent event node upon request.

An "event filter" is an object that transforms an event stream in a particular way. Event filters connect in a series so that complex event stream transformations can be constructed from simple event streams. Fundamentally, an event filter is responsible for providing, when requested, the next event node of an event stream. To fulfill a request, an event filter often must make requests of a prior event filter in the series. In this way, given a connected series of event filters, requesting event nodes of the last event filter causes all event filters to do the work necessary to transform the event stream. The first filter in a series of filters reads its events from an input SCF.

Events need not pass one-for-one through an event filter. In addition to modifying individual events, an event filter can remove events from, or add events to, an event stream. There is no facility for reprocessing events. An event stream proceeds forward in SCF-time, not backward. An event filter provides each event to a client once, and only once. Because of this, an object (a "replicator") for duplicating an event stream exists so that its events might be processed in two or more different ways.

A replicator reads a single event stream and outputs multiple event streams. A replicator provides the same event stream to multiple clients by duplicating the event nodes that the replicator reads from its source. The replicator's clients need not read events synchronously. The replicator maintains an internal queue of events, each of which may be read by at least one of the replicator's clients, but not necessarily by all of them. In this way, each client can request events at its own pace.

A "merger" is an object for joining event streams. At one point, all musical parts in an SCF file exist as separate streams, which must be combined for further processing. This combination is performed using a merger. A merger maintains proper time-sequencing of the event streams, i.e. the merger interleaves the streams to keep the resulting stream of events in SCF-time order. In addition, the merger can store, in each event node it processes, a number that indicates from which of the merger's sources the event node was read. This number is called a "source stamp". The source-stamped output of a merger is called a "composite event stream". A composite event stream is a single stream made up of individual "component" streams.

Events need not be only of the kind found in an SCF. Of particular value is a "measurement event" object. A measurement event object contains a single, signed 32-bit integral numeric value in addition to the standard time stamp. A stream that contains only measurement event is objects, or simply "measurement events" is called a "measurement stream". An event filter that transforms its input into a measurement stream is called an "evaluator".

The values specified by events in measurement streams are interpreted as follows: a measurement arriving at a certain point in SCF-time is presumed to hold true until the next measurement arrives. In this way, any stepwise function (limited to the values of a 32-bit signed integer) of SCF-time can be expressed as a measurement stream, and each measurement stream is, effectively, the specification of some step-wise function of SCF-time.

A composite event stream that contains only measurement event objects is called a "composite measurement stream". Such a stream is a convenient way to make multiple measurement streams appear as one.

An SCF is divided into discrete segments called "measures", which correspond to the natural rhythmic divisions of a musical composition from which the SCF was created. The total number of measures included in the SCF can be determined by examining the SCF file.

An "event buffer" is an object that permits the temporary storage of one or more events.

A "proximity thinner" is an object that removes events from an event stream based on the start times associated with those events. More specifically, a proximity thinner removes events that occur within a specified time interval from the start of a previous event. The time interval is specified when the proximity thinner is constructed.

A "pattern" is an object that encapsulates all the events of a single instrument that occur in one measure. An example is a pattern that encapsulates all of the events that define how a snare drum should be played in the tenth measure of an SCF. An empty pattern is valid and, in this embodiment, indicates that the snare drum should not be played at all in, e.g., measure ten.

A "pattern buffer" is an object that is associated with a single instrument and that temporarily stores one or more different patterns for that instrument. A stored pattern is identified by an integer representing that pattern's position in the pattern buffer. This integer is called a pattern identifier (ID). For each pattern, the pattern buffer also maintains a count of the number of times the pattern was encountered in the SCF. The number of times is called the pattern's "frequency".

A "composite pattern" is an object that encapsulates all events of two or more instruments that occur in one measure. An example is a composite pattern that encapsulates all events that define how a snare drum and a bass drum are played in the tenth measure of an SCF. To create a composite pattern, contents of one pattern are combined with another pattern or another composite pattern.

A "pattern map" is an object that identifies, for a single instrument, the specific pattern that is associated with each measure in an SCF. A pattern map is a list of pattern IDs, one for each measure in the SCF.

A "pattern analyzer" is an object that analyzes a pattern or composite pattern for the purpose of evaluating two separate characteristics: overall rhythmic complexity and regular rhythmic repetition. These characteristics, and how they are evaluated, are described below.

A "fuzzy comparison" is one that does not require an exact match of the two items being compared in order to declare them as identical. Some threshold slope, or "fuzz factor", is defined and used in the comparison. If the values for a given characteristic of two items being compared fall within the allowable fuzz factor, then that characteristic is considered to be identical for the two items. If all other characteristics are also similarly considered to be identical, then the items themselves are considered identical as well.

A common practice employed in processing events from an SCF is called "quantization". Quantization actually changes events, forcing numeric values they contain to be equal to the nearest multiple of a pre-defined quantity. It would seem reasonable to ask why quantization is not used to compare two patterns instead of using fuzz factors. After all, one could quantize all values of all the events in two patterns and check the two patterns for an exact match, which is a much more straightforward process than fuzzy comparison. Fuzz factors are used instead of quantizing because quantizing destroys information. This can result in undesirable results. For example, eighth-note triplets may be quantized into straight-eight notes, causing loss of the inherent feel of the pattern being quantized. Using "fuzz" is a easier than trying to create a "smart quantizer" that would not discard important information.

"Play-along" musical parts are of two kinds: "pitched", and "non-pitched". A pitched part is a musical part that may be played on an instrument that can be used to play melodies. Examples of such instruments include a piano, a guitar, a trumpet, or a violin. A non-pitched part is a musical part that may be played on drums, such as a multi-instrument drum kit, bongos, or various percussive instruments that are rarely used to play melodies.

A pitched part is generated by analyzing all pitched parts in a musical composition. For each point in time of the musical composition, the content of the one best pitched part is chosen for inclusion in the pitched part. In effect, the pitched part is a concatenation of the most appropriate segments of the pitched parts existing in the original musical composition. Software for generating a pitched part is described in more detail below.

A non-pitched part is generated by analyzing all non-pitched parts in the musical composition. For each point in time of the musical composition, the most appropriate elements of existing non-pitched parts are selected and combined to form a new non-pitched part. In effect, the non-pitched play-along part is a merging of all existing non-pitched parts, but with certain content removed in order to achieve a desired result. Software for generating a non-pitched part is described in more detail below.

II. Generating A Pitched Part

A process for generating a pitched part includes measuring, at each point in SCF-time, the quality of each pitched musical part in an original composition, and choosing, as SCF-time progresses, content from the best original part. To perform these tasks, two software event processors are used: the switcher and the chooser. The operation of these event processors is described below.

A. Switcher

A switcher receives two input streams: a control stream and a composite event stream. The control stream is a measurement stream that includes source identifiers. Each of the source identifiers is used to select a single component stream in an incoming composite event stream.

The switcher separates a selected component from the composite stream. By way of example, assume that a composite input stream exists that was created by a merger of six component streams. The control stream for the composite input stream contains values from zero to five, with zero corresponding to the first component stream, one corresponding to the second component stream, and so on. A switcher receives a value from the control stream and separates the component stream identified by that value from the composite stream.

The switcher reads events from both of its input (e.g., composite event) streams in SCF-time-order, and passes to its output only those events whose source stamps match a value in a most recently-read control stream event. Thus, at each point in SCF-time, the control stream determines which component stream gets passed to the switcher's output. Streams that are not output are suppressed.

B. Chooser

Turning now to the chooser, the chooser generates a measurement stream that indicates which of several input measurement streams contains the highest value at each point in SCF-time. The chooser treats each component of an input stream as a function of SCF-time and outputs a function that identifies the maximum input at each point in SCF-time. A chooser may also include a way to intelligently reduce the volatility of the output function (measurement stream). This feature is described below.

FIG. 1 shows how the software objects described above, namely, the replicator, chooser, switcher, merger, and evaluator, are interconnected to derive a pitched play-along part from multiple pitched input parts.

In FIG. 1, pitched input parts 0 through n are sent through replicators ($R_0$) 10 to ($R_n$) 13, which generate replicated outputs 10A to 13A. Outputs 10A to 13A are sent through evaluators ($E_0$) 15 to ($E_n$) 18, which generate n measurement streams 20. These measurement streams 20 are sent through merger (A) 22, where they are combined into a composite measurement stream 24. Composite measurement stream 24 is output to chooser 26. Chooser 26 outputs a single measurement stream 28. Single measurement stream 28 is indicative of the musical part in the composite measurement stream 24 that has the highest value at a current point in SCF-time. The single measurement stream 28 is used as the control stream for switcher 30. That is, measurement stream 28 selects switcher output 32.

Outputs 10B to 13B from each replicator ($R_0$) 10 to ($R_n$) 13 are sent directly into merger (B) 34. Merger (B) 34 merges the outputs (B) 10B to 13B to create a composite stream 36 of music data. This composite stream 36 is sent to switcher 30. Switcher 30 uses its input control stream 28 to choose which component of its input music stream 36 has the highest value at the current point in SCF-time and, thus, which component (10B, 11B, 12B or 13B) that switcher 30 should pass through to its output 32 at that time.

In operation, chooser 26 receives a composite measurement stream 24 (several functions of SCF-time) and outputs a stream 28 that identifies which component of the input stream has the highest value at any point in time. Sending such output to switcher 30 may result in a seemingly jumbled output musical part, i.e., a musical part whose component pieces (which constitute portions of input musical parts) are of a duration that may be too short to allow for melodies to be recognized. For example, a melodic line from one input part may start and then briefly be interrupted by an ornamental motif from another input part.

To avoid such unnecessary interruptions of otherwise cohesive sections of music, chooser 26 can be made to adopt a "longer term perspective" on its input stream 24. That is, chooser 26 can be prevented from making short-term diversions from a particular musical part. This is achieved using a process that is analogous to economic forecasting and by attributing a cost to the action of switching from one input stream to another. In order to be justified, switching streams must provide what night be called, metaphorically, an appropriate return on investment. The chooser can look arbitrarily far into the future of SCF-time with full knowledge in order to decide what to do in the present. This is done as follows.

Each component stream of measurement stream 24, which is input to chooser 26, includes measurement events that happen at specific times. As mentioned above, a measurement stream is an expression of a stepwise function of SCF-time. These components of measurement stream 24 (namely, streams 20) can thus be thought of as "input functions".

The contribution of an input function, between two specific points in SCF-time, is equal to the area below the function and above the SCF-time axis over the specified period. Portions of a function that are negative in value have a negative contribution. In mathematical terms, the contribution of a function is the integral of the function over the specified period. Since input functions are stepwise, such integrals are easy to compute. The computation amounts to adding and subtracting the areas of rectangles. For example, if function A has a value 3 from SCF-time 0 to 6, and value −1 from time 6 to 10, its contribution over the period from time 0 to time 10 is $$= (3*(6-0)) + (-1*(10-6))$$

$$= 18-4$$

$$= 14$$

The switch cost of a chooser is an amount that indicates how undesirable it is for the chooser to change its choice from one input function to another. The units for measuring switch cost are the same as the units for measuring the contribution of a function, i.e., value multiplied by SCF-duration.

As chooser 26 proceeds, its output value reflects the input function it considers optimal. At each point in SCF-time (except time zero, which will be discussed below), chooser 26 has the following decision to make:

(1) To remain committed to its current choice (keep the same output value).

(2) To choose a new input function (change the output value).

Option 2 incurs a switch cost, so it must be justified by observing the future values of all possible input functions. Option 1 incurs no cost, so it is justified by the simple fact that option 2 is not justified.

Since each input function is stepwise, composite measurement stream 24 can be characterized as follows: the measurement stream 24 contains durations during which no input function value changes, separated by points in SCF-time at which one or more input functions values change. The periods of SCF-time during which no input function value changes are called frames. Since changing of the output value must be motivated by some change in input conditions, the output value will never change during a frame, only at the points between frames.

Each input function has a specific contribution for each frame, which is equal to the SCF-duration of the frame times the value of the function during that frame. The problem of the chooser can thus be reduced to: for each frame, which input function should be identified as the optimum, given that switching from one input function to another incurs a cost?

The arbitration process performed by the switcher proceeds as follows, at the beginning of each frame, where "MAXIMUM_LOOKAHEAD" is the maximum amount of SCF time the switcher can look ahead in a musical composition.

```
for n = 1 to MAXIMUM_LOOKAHEAD {
    If, for the upcoming n frames, the currently selected input function F
    provides the greatest possible total contribution (or if there is a tie
    between F and another possible input function), then exit this loop
    and remain committed to F for the duration of the upcoming frame.
    Otherwise some other input function G provides the greatest
    possible contribution for the upcoming n frames.
    If G's total contribution minus switch cost C is greater than F's total
    contribution, then exit this loop and choose G as the new input
    function (output value).
}
If MAXIMUM_LOOKAHEAD was reached in the above process (the
loop ran to completion), remain committed to F for the duration of the
upcoming frame.
```

In the above way, each switch is justified in terms of actual future results, but no switching is performed unless the contribution gained outweighs the cost of switching.

The above process only seeks one justification. That is, it only looks as far into the future as it needs to in order to justify switching or staying. It does not look any further into the future to find out if there is another reason to do something else. As such, the process is not necessarily guaranteed to find the global optimum path through the frames. Shown below is an example where the actual, chosen path is not as good as another possibility. Assuming a switch cost of 10, and frame contributions as follows for input functions A and B:

| frame: | 1 | 2 | 3 | 4 |
|---|---|---|---|---|
| A: | 11 | 0 | 11 | 0 |
| B: | 0 | 11 | 0 | 11 |

Starting with function A, and switching three times, results in function B. The total contribution, minus the switch costs, will be 11+11−10+11−10+11−10=14. However, staying with function A through frame 2, and then switching to B at frame 4, the total contribution, minus the switch costs, will be 11+0+11+11−10=23.

In practice, however, the foregoing limitation is not a problem. The process as implemented runs faster than one that would yield a true global optimum path.

Since the switch cost exists, the choice of the first function, at the beginning of the first frame, should not be made arbitrarily. To do so might mean starting with a sub-optimal input function until another input function is good enough to override the switch cost. Accordingly, the process scans the frame contributions of all parts starting at SCF-time zero until it is found that, for some number N of frames, the total contribution of some input function F is greater than the switch cost plus the contribution of the next best input function G. Once this is done, the input function F is named as the first choice.

Using this method to make the first choice is equivalent to the method used for making all subsequent choices, except that no input function has any advantage over any other by virtue of being the current choice. The choice made should out-contribute the next-best choice by more than the switch cost.

Figure 2:
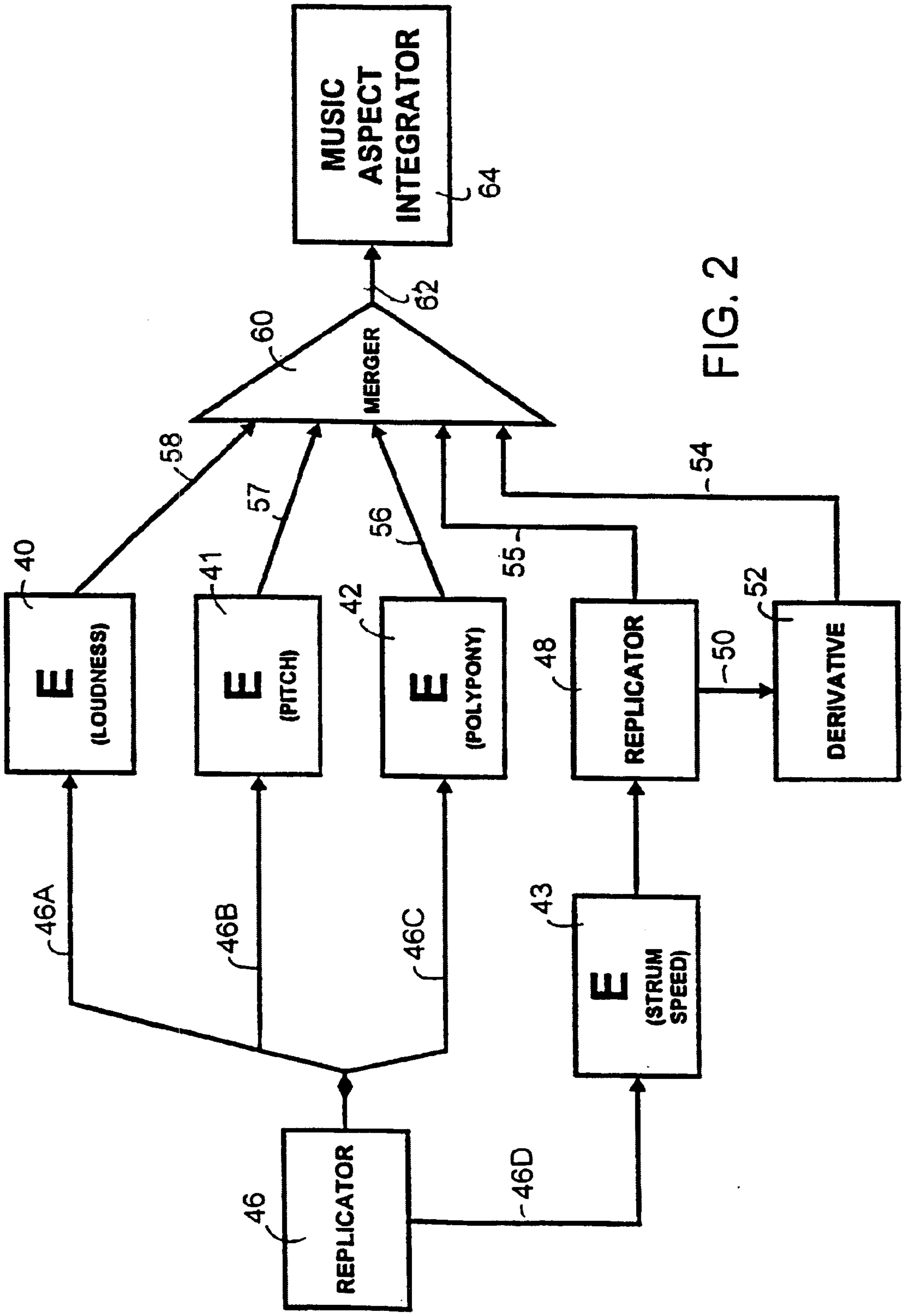
FIG. 2 is a block diagram of software Included in the block diagram of FIG. 1.

Referring to FIG. 2, the software architecture of each evaluator 15 to 18 (FIG. 1) is described. For chooser 26 to operate, it is given a composite measurement stream 24. Each component 20 of this stream is an evaluation of the short-term quality of an input musical part. These measurements are made by music evaluators 40 to 43.

Evaluators 40 to 43 process a stream of musical events and provide a stream of measurement events. The evaluators important to pitched part derivation are described below.

A strum speed evaluator measures how often a user would have to strum if the user were to trigger a given musical part. This value is measured in strums-per-second. For instance, a part containing successive quarter-notes, with a tempo of 120 beats-per-minute, and a time signature of 4/4, would have a strum speed of 2. Strum speed is reevaluated on each strum and its value is a constant multiplied by the reciprocal of the time until the next strum.

A pitch evaluator measures the average pitch of all sounding notes in an input stream. If no notes are sounding, the average pitch is defined to be zero. Middle C on the piano is defined to have a pitch value of 60. The pitch value of a note is higher by one for each half-step increase in pitch and lower by one for each half-step decrease in pitch.

A polyphony evaluator measures how many notes are sounding at each moment in SCF-time. The input music stream contains note-on events and note-off events. Note-on events cause the polyphony to increase by one. Note-off events cause the polyphony to decrease by one.

A loudness evaluator measures the perceived loudness of music in an input stream. Each note in a music stream has a velocity with which it is to be played. The notion of velocity comes from piano performance and refers to the speed with which a particular piano key is depressed. Higher velocities result in louder notes.

Also figuring into the loudness determination is a global volume applied to the entire part (in MIDI parlance, this is the channel volume), and an "expression factor", which is a value that can change while notes are being played, enabling swells and ebbs in note volume. The overall loudness is the average velocity of all currently sounding notes, multiplied by the global part volume and the current expression factor.

A derivative filter is used to measure the speed with which the values in an input stream are changing. It provides an output event node for each input event node, but the value it returns is a function of each input node and the next input node. The value output is proportional to the difference in values, divided by the difference in SCF-time. Appendix B shows computer code that shows one way to implement the derivative filter.

Referring to FIG. 2, replicator 46 creates four duplicates of an input musical part (not shown). Four evaluators 40 to 43 process the replicator outputs 46A to 46D, respectively, to measure various aspects of the music.

These aspects include strum speed (how often notes begin)

average pitch of sounding notes polyphony (number of notes sounding)

loudness (perceived sound level of notes sounding)

The output from "strum speed" evaluator 43 is run into another replicator 48, which has two outputs. One of these outputs 50 is passed through a derivative filter 52 (described above), to produce a measurement 54 that is indicative of strum acceleration.

The resulting five measurement streams 54 to 58, plus a binary measurement stream (zero or one—not shown) indicating the presence or absence of vocals of a karaoke singer, are merged by merger 60 into a composite measurement stream 62. This composite measurement stream 62 is provided to a music aspect integrator 64. Music aspect integrator 64 combines all of its input functions in such a way as to measure the musical quality of the part as described by its musical aspects.

One measurement in the composite measurement stream that is given to the music aspect integrator is not a measurement of the pitched input part in question. It is the measurement of the karaoke vocal part noted above. The karaoke vocal part is a musical part in the SCF file that contains the melody a singer is supposed to sing in the context of a karaoke application. The karaoke vocal part can be easily distinguished from the other parts by specific criteria (such as labeling or other indicators provided in the SCF by its creator) and it is not otherwise processed by the pitched part generation process.

Whether a singer should sing at any given point in SCF-time affects what would be considered a good pitched part. While the singer is not singing, it is preferred that the pitched part be as melodic as possible. This keeps the play-along part interesting and allows the user to act as a soloist. While the singer is singing, the play-along part should not contain melody, since this would detract from the vocals. Instead, the play-along part should be more polyphonic (multi-pitch, chordal). In common musical practice, polyphonic parts most often accompany melody. This is good for the situation where the singer is singing the melody. The user acts as his accompanist. Accordingly, the pitched part is fun when the singer isn't singing, and it is tasteful (i.e., and enjoyable, within the bounds of good taste) when the singer is singing.

The karaoke vocal part is processed as follows. The detected vocal part is run through a note detector (not shown), which outputs a measurement stream having a value of one when notes are sounding and a value of zero otherwise. The resulting measurement stream is sent through a "clumper", which is an event filter that outputs a measurement stream having a value of one, except during periods when its input is zero for over a specified amount of SCF-time. In practice, six beats worth of time works well, but shorter or longer SCF-time periods may also be used. The resulting output is a measurement stream having a value of one when the karaoke vocal contains music that remains silent for no longer than six beats at a time, and having a value of zero during any period where the karaoke vocal is silent for a period longer than six beats. The value of the measurement stream goes to zero when such period of silence begins and goes to one when it ends.

This measurement stream serves to indicate whether the singer is singing, or not, at each point in SCF-time. The stream is sent through a replicator to create enough copies of it so that each can be sent to the music aspect integrator for a single pitched input part, along with the music aspects of that part being integrated.

The music aspect integrator is similar to the chooser in the following ways:

It takes a composite measurement stream as input.

Its output is a single measurement stream.

It works with frames, i.e., periods of SCF-time during which none of its input values change.

The task of the music aspect integrator is, for each frame, to combine all of its input values to form a single output value for the frame representing the quality of the musical part being described by the input values.

The music aspect integrator outputs a single value at the beginning of each frame. This value is a function of all the input values for that frame, namely strum speed, average pitch, polyphony, loudness, strum acceleration, and the presence/absence of karaoke singer melody. The actual function that integrates the values may be one of many functions. The computer code shown in Appendix A is one way to implement the integrator. In the code, the variable "value" is the output value of the music aspect integrator for the current frame.

A complete description of the pitched part generation process is provided above. Variations on the pitched part generation process are now described.

For switcher 30 to operate, it treats each musical note as a single, indivisible unit. It is undesirable to switch input streams in the middle of a note, since an event signaling the end of that note would never come. For the sake of switching, then, each note is treated as a single event with a duration starting at a particular time. This way, each note is either kept or discarded as a whole. As well, the switcher maintains internal information about the musical state set up by each input stream (pitch bend, for example), so that when switching to any particular stream, the proper events for that stream are output in order to change the state of the event receiver to match the state required by the given input stream. In this way, the music coming out of a switcher sounds as it should.

One process by which the aspects of an input musical part are measured is described above with respect to FIG. 2. In other embodiments, there may be no replicator 46 that sends the input musical part through four evaluators. Instead, there may be a single object that evaluates the input stream in four different ways. This object generates four output measurement streams, as would emerge from four evaluators. But, since the initial replicator 46 is not necessary, commutation time is reduced because fewer event nodes need to be created and then destroyed.

Certain pitched parts in the SCF may be ignored for the sake of pitched part generation. Such parts are easily identifiable by certain criteria or conventions, such as "being the third part specified in the SCF". Examples of parts that are ignored may include: the bass part, the guide melody, and vocal harmony parts.

As a way to increase the speed of the process, the entire SCF may be preprocessed by performing what is called "time cleaning". Time cleaning is performed by an event filter that causes any events that occur very close to each other (i.e., within a predetermined period in SCF-time) to have the exact same time stamp. This reduces the number of frames that choosers and music aspect integrators have to address during processing of the streams.

III. Generating A Non-Pitched Part

Non-pitched parts within an SCF are easily distinguished from pitched parts by one or more predetermined criteria, such as their location in the SCF file. For example, a MIDI file is comprised of tracks. These tracks correspond to one or more instruments. MIDI track ten include the non-pitched instruments. For the purpose of describing the non-pitched part generator, the term "full non-pitched part" is defined to mean the consolidation of all non-pitched parts contained in an SCF. Note that each non-pitched part can contain musical notes associated with one or more non-pitched musical instruments. As noted above, non-pitched musical instruments include various percussion instruments making up the standard drum kit, in addition to other miscellaneous percussion instruments. These instruments include, but are not limited to, the following instruments:

Standard drum kit:

bass drum snare drum tom-tom drums splash cymbals crash cymbals ride cymbals high-hat cymbals Miscellaneous percussion:

tambourine maracas wood blocks cowbells congas bongos

For the sake of convenience, whenever the word "instrument" is used anywhere within this section (section II: Generating A Non-Pitched Part), it will refer to any non-pitched musical instrument, such as those noted above.

A professional drummer's performance typically makes use of a standard drum kit plus other miscellaneous percussion instruments and involves simultaneously playing various instruments using coordinated movements of two hands and two feet. The resulting composite rhythms generated by the drummer's performance will likely be too complex for an average user to negotiate, especially when limited to using a single controller (e.g., microprocessor) to generate the musical parts described herein. Since the drum performance contained in the SCF is created to closely mimic that of a real drummer, merely extracting that performance and presenting it to a user as a play-along part is undesirable The task of the non-pitched part generator is to create a play-along part that meets the following criteria:

(1) works well when played along with a full musical composition represented in an SCF (2) is not too complex for the average user to negotiate (3) is as varied and interesting as possible.

The first criterion is met by constructing the play-along part using individual elements that exist in the full non-pitched part represented in the SCF. Since each element was designed to work well with the full musical composition, any combination of those elements should, in theory, work well also. Therefore, the essence of the non-pitched part generator is to break the SCF's full non-pitched part down into all its component pieces and determine the best combination of those pieces that will satisfy the second and third criteria. These pieces are called patterns, which are defined above in section I: Definitions.

Figure 3:
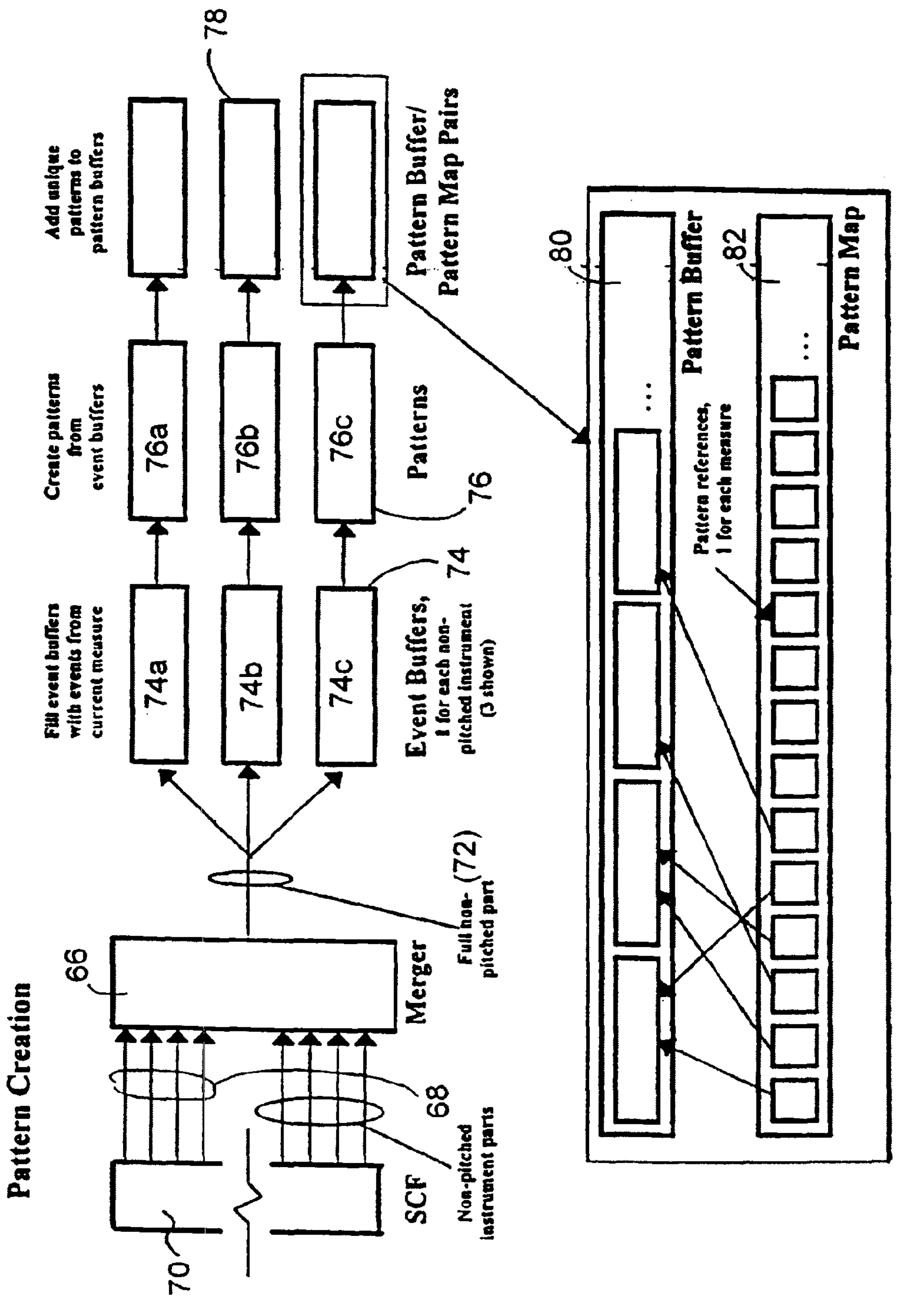
FIG. 3 is a block diagram of software for use in generating a non-pitched musical part.

Referring to FIG. 3, the non-pitched part generation process begins by using a merger 66 to combine all non-pitched parts 68 contained in the SCF 70 into a single, SCF-time-ordered event stream 72. Though these events are merged for processing, they can be separated by instrument. This is because each event in the SCF identifies which instrument that the event is intended to control. As described below, the event buffers 74 are filled with musical events for one measure for each instrument in the full non-pitched part. Events from these buffers are output to create patterns 76. Unique patterns are added to pattern buffer/map pairs 78. These patterns are selectively combined to create a non-pitched musical part.

The creation of the non-pitched play-along part is a two step process: pattern creation and part generation. In this embodiment, the pattern creation process runs first, in its entirety, before the part generation takes place.

A. Pattern Creation

Pattern creation is a process in which rhythms used by all non-pitched instruments in the SCF file are analyzed and identified. The purpose of pattern creation is to express each non-pitched part in an SCF file as a combination of a small number of identifiable patterns.

The number of new patterns 76 created is equal to the number of instruments multiplied by the number of measures in the SCF. The number of new patterns that will actually be stored in pattern buffers, however, will likely be much less. This is because duplicate patterns are not stored in a pattern buffer. Not only does this reduce the required storage space, but it also provides a way to log the frequency of recurring patterns for a given instrument across multiple measures.

The pattern creation proceeds as follows. The process creates an empty event buffer 74 for each instrument, an empty pattern buffer 80 for each instrument, and a corresponding empty pattern map 82 for each instrument. For each measure in a song, the process reads all events from the full non-pitched part for the current measure, filling the event buffers 74 for each instrument with the instrument's events from the current measure. For each instrument, the process creates a corresponding new pattern 76 from the instrument's event buffer. The process then performs pattern comparison to determine if a pattern already exists for the current instrument in a pattern buffer/map 78. If a pattern already exists, the process increments the pattern's frequency in the pattern buffer, takes note of the pattern's ID, and discards the pattern, since a copy of it already exists. If the pattern does not exist, the process adds the new pattern to a pattern buffer 80, giving it the next available pattern ID, and giving it a frequency of one. The process also adds the pattern's ID to the instrument's corresponding pattern map 82 and empties the instrument's event buffer.

At this point, information about a pattern can be extracted from the pattern buffers 80 and pattern maps 82. For example, it is possible to use the snare drum's pattern buffer and the snare drum's pattern map to determine which rhythm was used by the snare drum in measure ten. The snare drum's pattern buffer also indicates how frequently any pattern was used by the snare drum in the entire SCF.

In this embodiment, pattern comparison (part of the pattern creation process) is a two-tiered fuzzy comparison process. A fuzzy comparison of two patterns is considered successful (i.e., the patterns are considered identical) if more than a certain percentage of the fuzzy comparisons of the individual events in the two patterns are considered successful. Typically, this threshold percentage is over ninety percent. For the purpose of these comparisons, only note-on events are considered, because they are the only events that impact a pattern's rhythm. For each pair of note-on events compared, three values are examined: the event's instrument, the event's time stamp, and the velocity, or loudness of the event.

First, the time stamps are compared. If their difference falls outside the allowable fuzz factor for time units, the fuzzy event comparison fails and is terminated. Next, instruments are compared. There is no fuzz here. If the instruments do not match exactly, the fuzzy event comparison fails and is terminated. Finally, note velocities are compared. If their difference falls outside the allowable fuzz factor for velocity units, the comparison fails. Otherwise, the fuzzy event comparison is successful.

Of particular interest is what happens when a fuzzy event comparison fails only because the events' time stamps are too far apart. In that case, the possibility is considered that the two patterns are out of synchronization. The event that exhibited the earlier time stamp is skipped and its subsequent event is used in the comparison instead. The reason for this is made clear by an example. If two patterns, each containing many events, are exactly identical in all respects, except that one event in one of the patterns is missing, it would not be desirable to automatically consider the patterns a mismatch. Whenever an event is skipped in this manner, a penalty is incurred that is equivalent to a single mismatched pair of events.

B. Part Generation

Part generation is a process in which the patterns identified in the pattern creation process are selectively combined to form the final non-pitched play-along part. The goal is to create an appropriate composite pattern for each measure of a song. Part generation emphasizes the use of uncommonly occurring (low-frequency) rhythmic patterns to ensure that the play-along part is interesting and varied.

For each measure of a composition, the part generation process begins by selecting the instrument whose pattern, for the measure, has the lowest frequency. In the event of a tie, the instrument encountered first is selected. Then, patterns from other instruments are added. Patterns with low frequencies are selected first to be sure they are included in the final play-along part. Patterns with higher frequencies are added later and have a higher probability of being discarded as a result of pattern analysis.

Figure 4:
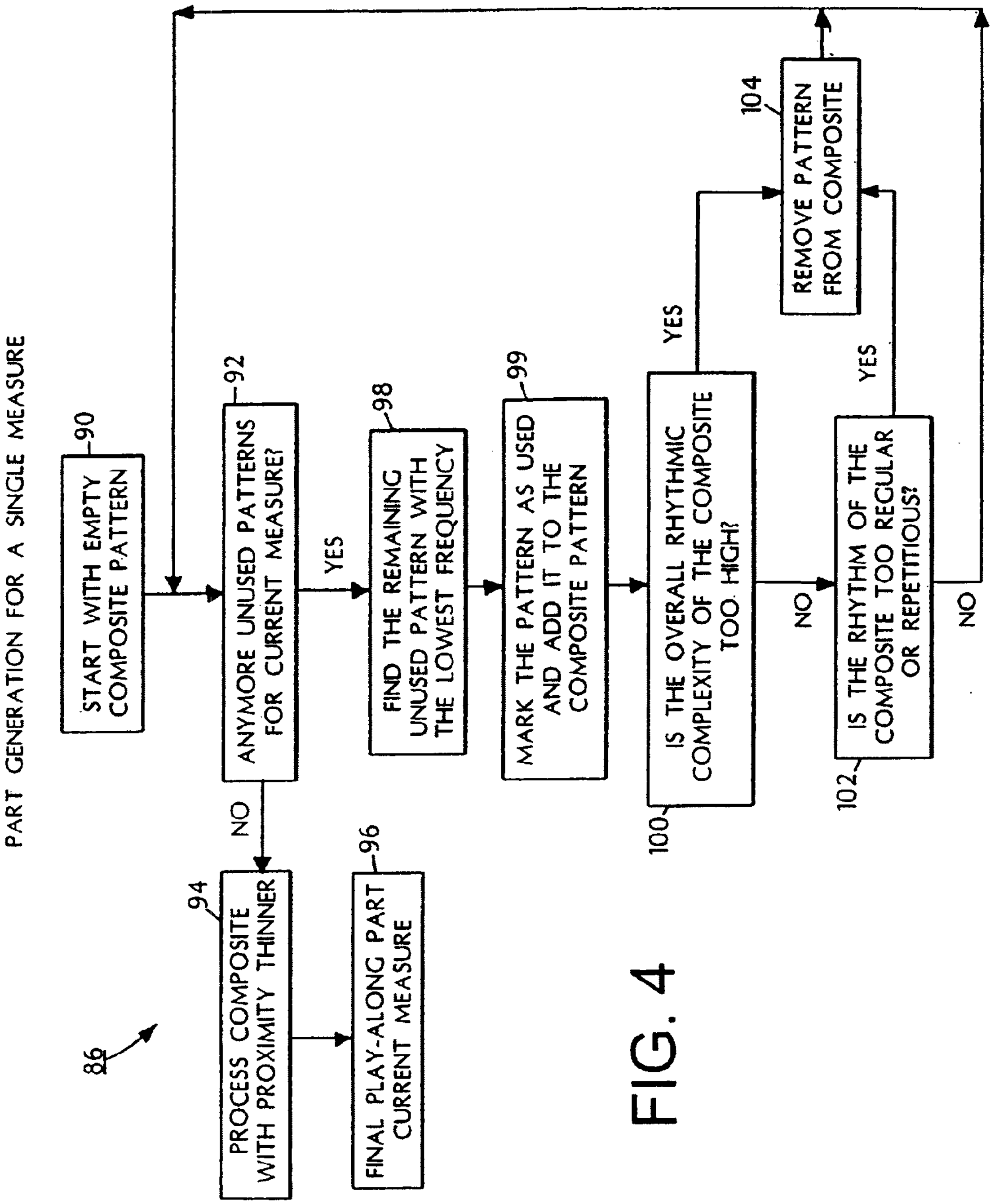
FIG. 4 is a flowchart showing a process for use in generating the non-pitched musical part.

FIG. 4 shows a part generation process 86 for a single measure. For each measure, process 86 starts (90) with an empty composite pattern. Process 86 examines the patterns for all instruments that sound in the measure. If all patterns have been used (92), process 86 processes the composite pattern with a proximity thinner (94) (described above) and assigns (96) the result to be the final play-along part for the current measure. If all patterns have not been used for the current measure of the musical composition (92), process 86 finds (98) among them the lowest-frequency pattern that has not yet been used.

Process 86 marks (99) the pattern as used and adds the pattern to the composite pattern. If a pattern analyzer object determines that the overall rhythmic complexity of the composite pattern is too high (100), or if the rhythm of the composite pattern has become too regular or repetitious (102), process 86 removes the pattern from the composite pattern and repeats the process for the next pattern.

The proximity thinner is used to assure that no two events in the stream occur so close together in time that the user would not be able to trigger them separately, given the limitations of a controller, e.g., microprocessor, used to generate the musical parts described herein.

The pattern analyzer measures the overall rhythmic complexity of the composite pattern. If the composite pattern is too complex for the user to negotiate, the single pattern last added is removed from the composite pattern and discarded. Otherwise, the composite pattern is analyzed further to make sure that the latest addition has not caused the overall rhythm of the composite pattern to become too regular and repetitious. If it has become too regular and repetitious, the single pattern last added is removed and discarded. The process proceeds until there are no more patterns to try adding to the composite pattern.

Any single or composite pattern can be evaluated by the pattern analyzer to determine a number that is indicative of how difficult it would be for a user to play the rhythm represented by the given pattern. The pattern analyzer assigns difficulty points to every musical note in the pattern it evaluates. The number of difficulty points assigned to a given note represents how difficult the note's rhythm is to play. A running total of these difficulty points is kept as the pattern analyzer traverses the pattern. When the end of the pattern is reached, the total number of difficulty points is compared against a pre-defined threshold value. If the threshold is exceeded, the rhythm of the pattern is considered too complex for the average user to play, individual notes are assigned three types of difficulty points based on the following criteria:

(1) Beat Points: where the note falls relative to the beat (2) Syncopation Points: whether or not the note is part of a syncopated rhythm (3) Proximity Points: how close together the note is to other notes Each note receives zero or more difficulty points of each type, as appropriate 1. Beat Points Rhythms including notes that occur on the beat are relatively easy to play. Therefore, if a note occurs on the beat, it is assigned zero beat points by the pattern analyzer. If a note occurs half-way in between two beats, i.e., on the half-beat, the note is assigned some small amount of beat points. If a note occurs on the quarter-beat, it is assigned more beat points still. If a note occurs on the third-beat, as would be the case with triplets or swing feel, the note is assigned even more beat points. Finally, if the note doesn't fall in any of the above categories, it is considered to be on some other, more obscure part of the beat, and it is assigned the highest possible number of beat points by the pattern analyzer.

2. Syncopation Points

The pattern analyzer will add syncopation points to any note that is considered to be syncopated. Syncopated rhythms are generally more difficult to play, especially for those with little musical background. To be considered syncopated, a note must occur half-way between two beats (on the half-beat), and there must not be a note occurring on the immediately preceding beat. This means that the preceding beat is inferred and must be recognized by the player even though it does not sound.

3. Proximity Points

Finally, a note will be given proximity points by the pattern analyzer if the note occurs very close in time to the immediately preceding note. Through experimentation, it has been determined that an average user can easily trigger up to about six notes per second (though not for extended periods of time). This assumes that the triggering device is fairly responsive. If a given note follows its preceding note by less than an amount that would coincide with a rate of six notes per second, no proximity points are added. If notes are coming at a rate faster than six notes per second, some proximity points are added. If the rate climbs to over eight notes per second, more proximity points are added. If the rate climbs higher than ten notes per second, the maximum number of proximity points are added.

If multiple instruments have notes that occur at the same time in the pattern, only one of these notes is assigned points. The pattern analyzer only addresses notes with unique start times. Superimposed notes will not make a given rhythm harder for the user to play, they will just cause the user to sound multiple instruments at once.

If a given pattern contains two times as many equally-spaced notes as there are beats in the pattern, with every other note falling on a beat, the pattern is considered to be too regular and repetitious. Such a pattern would contain what is commonly referred to as straight eight-notes. If a given pattern contains three times as many equally-spaced notes as there are beats in the pattern, with every third note falling on a beat, the pattern is also considered to be too regular and repetitious. Such a pattern would contain what is commonly referred to as straight eight-note triplets, and would have a swing feel. If adding a single pattern to a composite pattern causes the composite to exhibit either of these conditions, the single pattern just added is removed from the composite by the pattern analyzer.

The actual numbers of different types of difficulty points issued, the value of the difficulty threshold, and the values used to define fuzz factors and threshold percentages can all be modified to make the resulting generated part easier, or more challenging to play.

The following are descriptions of optimizations made to the non-pitched part generation process. These optimizations are not required; however, they do provide speed enhancements when implemented.

Since non-pitched part generation deals specifically with rhythms, only note-on events are required. Note-off events are passed on through to the play-along part, because some synthesizers require them, but they are not used by the non-pitched part generator. As such, all other events can be filtered-out up front. This will save the extra overhead of having every step in the process check for, and reject, all extraneous events. This is accomplished with a "type thinner". A type thinner is an event filter that is used to selectively remove specific types of events from an event stream. The type or types of events to be removed are specified when the thinner is constructed. As an alternative, a type thinner can be constructed to remove events of any type except those types specified. So here we pre-filter the event stream using a type thinner that removes all events but note-on and note-off events.

An optimization can be made for when a newly created pattern must be compared to all the existing patterns in a pattern buffer. This is because the fuzzy comparison of the patterns is a relatively slow process. When a pattern is put in a pattern buffer, a CRC (Cyclical Redundancy Check) is determined from the contents of that pattern, and is attributed to the pattern. A CRC is a 32-bit integer value created by a well-known process. The CRC identifies the contents of the pattern for the sake of exact (non-fuzzy) comparison. Two patterns whose CRCs are identical have an extremely high probability of being identical. Two patterns whose CRCs differ are not identical.

Therefore, when comparing two patterns, the CRCs of the two patterns are compared first. If the CRCs are equal, which is often the case, the patterns are taken to match exactly, and the relatively slow, fuzzy comparison is bypassed. If the CRCs do not match, then the fuzzy comparison is performed.

IV. Architecture

Figure 5:
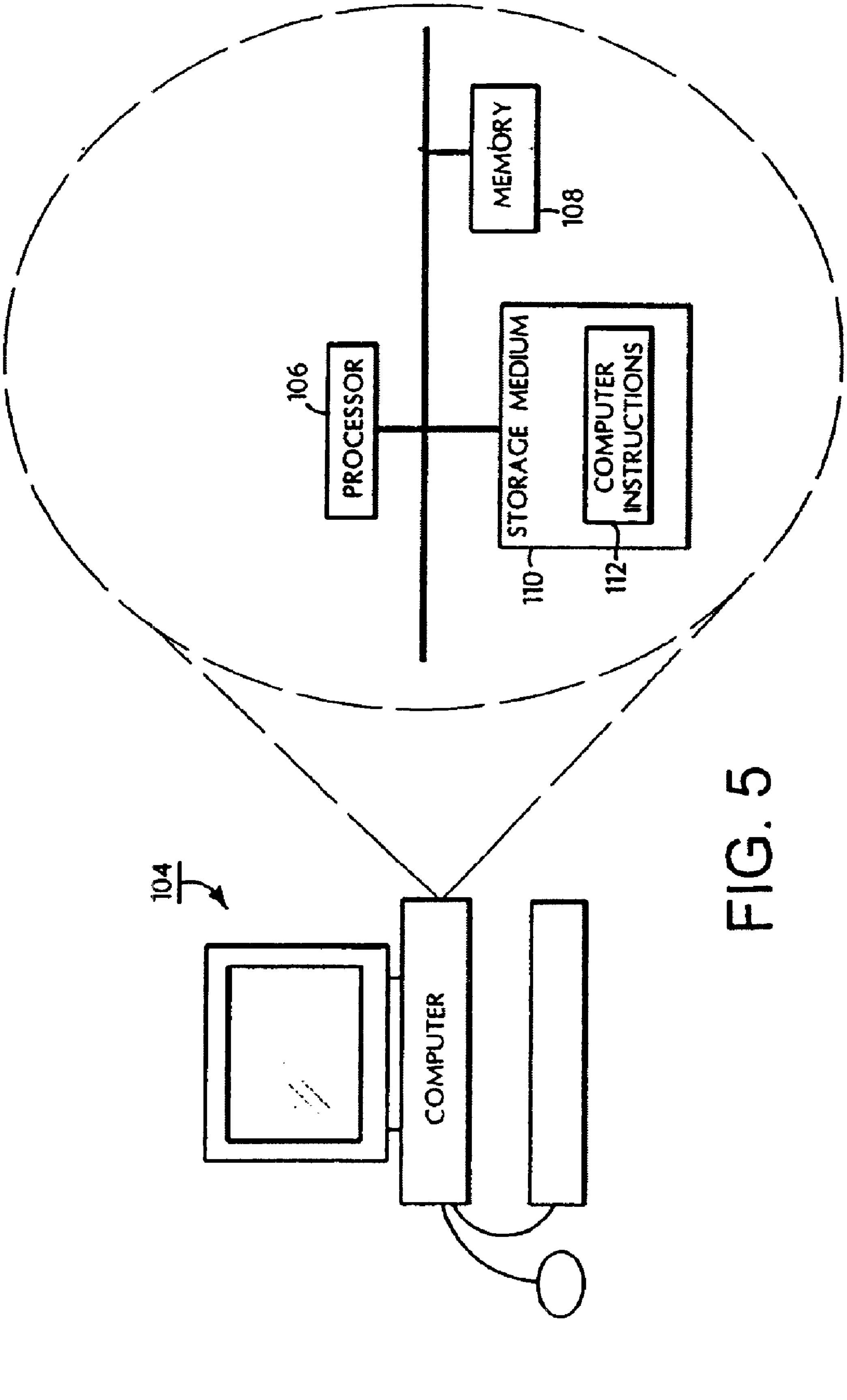
FIG. 5 is a block diagram of hardware on which the software of FIGS. 1 to 4 may be implemented.

FIG. 5 shows a computer 104 for generating musical parts according to the processes described herein and in conjunction with FIGS. 1 to 4. Computer 104 includes a processor 106, random access memory 108, and a storage medium 110 (e.g., a hard disk). Storage medium 110 stores computer instructions 112, which are executed by processor 106 out of memory 108, to generate both pitched and non-pitched musical parts using the processes/software described herein.

The processes/software described herein are not limited to use with the hardware/architecture/GUI configurations of FIGS. 1 to 5; they may find applicability in any computing or processing environment. The processes may be implemented in hardware, software, or a combination of the two (e.g., using an ASIC (application-specific integrated circuit) or programmable logic). The processes may be implemented in one or more computer programs executing on programmable computers that each includes a processor, a storage medium readable by the processor (including volatile and non-volatile memory and/or storage elements), at least one input device, and one or more output devices. Program code may be applied to data entered to generate output information.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to implement the system. The system may also be implemented, at least in part, as a computer-readable storage medium, configured with a computer program, where, upon execution, instructions in the computer program cause a computer to operate appropriately.

The SCF, or electronic music, files may be obtained from any source. For example, they may be downloaded from a network, such as the Internet, retrieved from a storage medium, such as a compact disk, or generated on a synthesizer and input directly to computer 104.

The invention is not limited to the specific objects and other software described above. Other embodiments are also within the scope of the following claims.

What is claimed is:

1. A computer-implemented method for generating a musical part from an electronic music file comprised of pitched instrumental parts, the method comprising:

generating a control stream that indicates which of the instrumental parts has a highest value for each of a plurality of periods of time, wherein generating the control stream involves for each of the plurality of periods of time comparing a contribution of one instrumental part for that period of time to a contribution of another instrumental part for that period of time and wherein generating the control stream is based on a cost of switching between the one instrumental part and the other instrumental part;

for each of said plurality of periods of time, selecting one of the instrumental parts for that period of time based on the control stream; and outputting the selected instrumental part for each of said plurality of periods of time to produce the musical part.

2. The method of claim 1, wherein generating the control stream involves determining for each of said plurality of periods of time which of the instrumental parts has a highest value for that period of time and involves for each of said plurality of periods of time examining other periods of time defined by the electronic music file.

3. The method of claim 1, wherein generating the control stream comprises:

obtaining measurement streams which include values for corresponding instrumental parts; and identifying for each of the plurality of periods of time an instrumental part in the measurement streams that has the highest value for that period of time.

4. The method of claim 3, wherein obtaining the measurement streams includes analyzing aspects of the musical part.

5. The method of claim 4, wherein the aspects include one or more of strum speed, average pitch, polyphony, loudness, and a vocal part.

6. The method of claim 3, wherein generating the control stream further comprises merging the measurement streams to obtain a composite measurement; stream, and the instrumental part in the measurement streams that has the highest value for each period of time is identified by using the composite measurement stream.

7. The method of claim 1, wherein the electronic music file comprises a Musical Instrument Digital Interface (MIDI) file.

8. The method of claim 1, wherein each instrumental part comprises a stream of events, each event in the stream of events having a time stamp, and wherein the method further comprises changing time stamps of events that are within a predetermined time period of each other so that the time stamps are the same.

9. The method of claim 1, wherein generating is performed using a chooser object and selecting and outputting are performed using a switcher object.

10. The method of claim 1, further comprising:

for each of a second plurality of periods of time, identifying a plurality of patterns in the electronic music file; and for each of said second plurality of periods of time, selectively combining multiple of said plurality of identified patterns for that period of time to produce the musical part, wherein patterns having relatively low frequencies are combined to produce the musical part before patterns having relatively high frequencies are combined.

11. The method of claim 10, wherein the patterns comprise individual instrumental tracks in the electronic music file.

12. The method of claim 10, wherein selectively combining for each of said plurality of periods of time comprises:

selecting one of the identified patterns;

determining if a rhythmic complexity of the selected pattern exceeds a predetermined threshold; and adding the selected pattern to the musical part if the rhythmic complexity of the selected pattern does not exceed the predetermined threshold.

13. The method of claim 12, wherein selectively combining for each of said plurality of periods of time further comprises discarding the selected pattern for that period of time if the rhythmic complexity of the selected pattern exceeds the predetermined threshold.

14. The method of claim 12, wherein the rhythmic complexity of the selected pattern is determined based on musical features of the selected pattern.

15. The method of claim 14, wherein the musical features comprise one or more of a beat of the selected pattern, syncopated notes in the selected pattern, and proximity of notes in the selected pattern to other notes in the selected pattern.

16. The method of claim 10, wherein selectively combining for each of said plurality of periods of time comprises:

selecting one of the identified patterns;

determining if the selected pattern is similar to a pattern already in the musical part; and adding the selected pattern to the musical part if the selected pattern is not similar to a pattern already in the musical part.

17. The method of claim 16, wherein selectively combining for each of said plurality of periods of time further comprises discarding the selected pattern for that period of time if the selected pattern is similar to a pattern already in the musical part.

18. The method of claim 16, wherein determining is performed using a fuzzy comparison.

19. The method of claim 16, wherein determining is performed using quantization.

20. The method of claim 10, wherein the electronic music file comprises a Musical Instrument Digital Interface (MIDI) file.

21. The method of claim 10, wherein the electronic music file comprises events and wherein the method further comprises removing all but pre-specified events from the electronic music file prior to performing identifying and selectively combining.

22. The method of claim 1 wherein the periods of time in said plurality of periods of time are measures of a musical piece.

23. The method of claim 1 wherein the periods of time in said plurality of periods of time are measures of a musical piece.

24. A computer program stored on a computer-readable medium for generating a musical part from an electronic music file comprised of pitched instrumental parts, the computer program comprising instructions that cause a computer to:

generate a control stream that indicates which of the instrumental parts has a highest value for each of a plurality of a periods of time;

for each of said plurality of periods of time, select one of the instrumental parts for the period of time based on the control stream; and output the selected instrumental part for the period of time to produce the musical part, wherein the computer program further comprises instructions that cause the computer to generate the control stream by comparing for each of said plurality of periods of time a contribution of one instrumental part for that period of time to a contribution of another instrumental part for that period of time and to generate the control stream based on a cost of switching between the one instrumental part and the other instrumental part.

25. The computer program of claim 24, wherein the computer program further comprises instructions that cause the computer to generate the control stream by examining for each period of time other periods of time defined by the electronic music file.

26. The computer program of claim 24, wherein the computer program further comprises instructions that cause the computer to generate the control stream by: obtaining measurement streams which include values for corresponding instrumental parts; and identifying for each of the plurality of periods of time an instrumental part in the measurement streams that has the highest value for that period of time.

27. The computer program of claim 26, wherein obtaining the measurement streams includes analyzing aspects of the musical part.

28. The computer program of claim 27, wherein the aspects include one or more of strum speed, average pitch, polyphony, loudness, and a vocal part.

29. The computer program of claim 26, wherein the computer program further comprises instructions that cause the computer to generate the control stream by merging the measurement streams to obtain a composite measurement stream, and wherein the instrumental part in the measurement streams that has the highest value for the each period of time is identified by using the composite measurement stream.

30. The computer program of claim 24, wherein the electronic music file comprises a Musical Instrument Digital Interface (MIDI) file.

31. The computer program of claim 24, wherein each instrumental part comprises a stream of events, each event in the stream of events having a time, stamp, and wherein the computer program further comprises instructions that cause the computer to change time stamps of events that are within a predetermined time period of each other so that the time stamps are the same.

32. The computer program of claim 24, wherein generating is performed using a chooser object and selecting and outputting are performed using a switcher object.

33. The computer program of claim 24, further comprising instructions that cause the computer to:

for each of a second plurality of periods of time, identify a plurality of patterns in the electronic music file; and for each of said second plurality of periods of time, selectively combine multiple of said plurality of identified patterns for that time period to produce the musical part, wherein patterns having relatively low frequencies are combined to produce the musical part before patterns having relatively high frequencies are combined.

34. The computer program of claim 33, wherein the patterns comprise individual instrumental tracks in the electronic music file.

35. The computer program of claim 33, further comprising instructions that cause the computer to selectively combine for each of said plurality of periods of time by:

selecting one of the identified patterns;

determining if a rhythmic complexity of the selected pattern exceeds a predetermined threshold; and adding the selected pattern to the musical part if the rhythmic complexity of the selected pattern does not exceed the predetermined threshold.

36. The computer program of claim 35, further comprising instructions that cause the computer to discard the selected pattern if the rhythmic complexity of the selected pattern exceeds the predetermined threshold.

37. The computer program of claim 35, wherein the rhythmic complexity of the selected pattern is determined based on musical features of the selected pattern.

38. The computer program of claim 37, wherein the musical features comprise one or more of a beat of the selected pattern, syncopated notes in the selected pattern, and proximity of notes in the selected pattern to other notes in the selected pattern.

39. The computer program of claim 33, further comprising instructions that cause the computer to selectively combine by:

selecting one of the identified patterns;

determining if the selected pattern is similar to a pattern already in the musical part; and adding the selected pattern to the musical part if the selected pattern is not similar to a pattern already in the musical part.

40. The computer program of claim 39, further comprising instructions that cause the computer for each of said periods of time to discard the selected pattern for that period of time if the selected pattern is similar to a pattern already in the musical part.

41. The computer program of claim 39, wherein determining is performed using a fuzzy comparison.

42. The computer program of claim 39, wherein determining is performed using quantization.

43. The computer program of claim 33, wherein the electronic music file comprises a Musical Instrument Digital Interface (MIDI) file.

44. The computer program of claim 33, wherein the electronic music file comprises events and wherein the computer program further comprises instructions that cause the computer to remove all but pre-specified events from the electronic music file prior to performing identifying and selectively combining.

45. An apparatus for generating a musical part from an electronic music file comprised of pitched instrumental parts, the apparatus comprising:

a memory that stores executable instructions; and a processor that executes the instructions to:

generate a control stream that indicates which of the instrumental parts has a highest value for each of a plurality of periods of time;

select one of the instrumental parts for the period of time based on the control stream; and output the selected instrumental part for the period of time to produce the musical part, wherein the instructions cause the processor to generate the control stream by comparing for each of said plurality of periods of time a contribution of one instrumental part for that period of time to a contribution of another instrumental part for that period of time and to generate the control stream based on a cost of switching between the one instrumental part and the other instrumental part.

46. The apparatus of claim 45, wherein the executable instructions further comprise instructions that cause the processor to generate the control stream by examining for each of said plurality of periods of time other periods of time defined by the electronic music file.

47. The apparatus of claim 45, wherein the executable instructions further comprise instructions that cause the processor to generate the control stream by: obtaining measurement streams which include values for corresponding instrumental parts; and identifying for each of said plurality of periods of time an instrumental part in the measurement streams that has the highest value for that period of time.

48. The apparatus of claim 47, wherein obtaining the measurement streams includes analyzing aspects of the musical part.

49. The apparatus of claim 48, wherein the aspects include one or more of strum speed, average pitch polyphony, loudness, and a vocal part.

50. The apparatus of claim 47, wherein the executable instructions further comprise instructions that cause the processor to generate the control stream by merging the measurement streams to obtain a composite measurement stream and wherein the instrumental part in the measurement streams that has the highest value for each period of time is identified by using the composite measurement stream.

51. The apparatus of claim 45, wherein the electronic music file comprises a Musical Instrument Digital Interface (MIDI) file.

52. The apparatus of claim 45, wherein each instrumental part comprises a stream of events, each event in the stream of events having a time stamp, and wherein the executable instructions further comprise instructions that cause the processor to change time stamps of events that are within a predetermined time period of each other so that the time stamps are the same.

53. The apparatus of claim 45, wherein generating is performed using a chooser object and selecting and outputting are performed using a switcher object.

54. The apparatus of claim 45, wherein the processor executes the instructions to:

for each of a second plurality of periods of time, identify a plurality of patterns in the electronic music file; and for each of said second plurality of periods of time, selectively combine multiple of said plurality of identified patterns for that time period to produce the musical part, wherein patterns having relatively low frequencies are combined to produce the musical part before patterns having relatively high frequencies are combined.

55. The apparatus of claim 54, wherein the patterns comprise individual instrumental tracks in the electronic music file.

56. The apparatus of claim 54, wherein the executable instructions further comprise instructions that cause the processor selectively combine for each of said periods of time by:

selecting one of the identified patterns;

determining if a rhythmic complexity of the selected pattern exceeds a predetermined threshold; and adding the selected pattern to the musical part if the rhythmic complexity of the selected pattern does not exceed the predetermined threshold.

57. The apparatus of claim 56, wherein the executable instructions further comprise instructions that cause the processor to discard the selected pattern if the rhythmic complexity of the selected pattern exceeds the predetermined threshold.

58. The apparatus of claim 56, wherein the rhythmic complexity of the selected pattern is determined based on musical features of the selected pattern.

59. The apparatus of claim 58, wherein the musical features comprise one or more of a beat of the selected pattern, syncopated notes in the selected pattern, and proximity of notes in the selected pattern to other notes in the selected pattern.

60. The apparatus of claim 54, wherein the executable instructions further comprise instructions that cause the processor selectively combine by:

selecting one of the identified patterns;

determining if the selected pattern is similar to a pattern already in the musical part; and adding the selected pattern to the musical part if the selected pattern is not similar to a pattern already in the musical part.

61. The apparatus of claim 60, wherein the executable instructions further comprise instructions that cause the processor for each of said periods of time to discard the selected pattern if the selected pattern for that time period is similar to a pattern already in the musical part.

62. The apparatus of claim 60, wherein determining is performed using a fuzzy comparison.

63. The apparatus of claim 60, wherein determining is performed using quantization.

64. The apparatus of claim 54, wherein the electronic music file comprises a Musical Instrument Digital Interface (MIDI) file.

65. The apparatus of claim 54, wherein the electronic music file comprises events, and wherein the executable instructions further comprise instructions that cause the processor to remove all but pre-specified events from the electronic music file prior to performing identifying and selectively combining.

* * * * *